US008929349B2

(12) United States Patent  
Park

(10) Patent No.: US 8,929,349 B2  
(45) Date of Patent: Jan. 6, 2015

(54) APPARATUS AND METHOD FOR DETERMINING VALIDITY OF WIFI CONNECTION IN WIRELESS COMMUNICATION SYSTEM

(75) Inventor: Youn-Ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 13/214,504

(22) Filed: Aug. 22, 2011

(65) Prior Publication Data

US 2012/0057578 A1 Mar. 8, 2012

(30) Foreign Application Priority Data

Sep. 7, 2010 (KR) .................. 10-2010-0087297

(51) Int. Cl.
*H04W 4/00* (2009.01)
*H04W 76/02* (2009.01)
*H04W 84/12* (2009.01)

(52) U.S. Cl.
CPC .............. *H04W 76/02* (2013.01); *H04W 84/12* (2013.01); *Y02B 60/50* (2013.01)
USPC ....................................................... 370/338

(58) Field of Classification Search
USPC ......... 370/217, 252, 254, 328, 329, 338, 389, 370/331, 401; 709/227, 228, 229, 239, 240, 709/238, 245, 203; 455/456.3, 456.1, 455/422.1, 435.1, 414.1, 466, 436
See application file for complete search history.

(56) References Cited

U.S. PATENT DOCUMENTS

| 8,190,768 B2 * | 5/2012 | Oba et al. ........................ 709/238 |
| 2004/0066759 A1 * | 4/2004 | Molteni et al. ................ 370/329 |
| 2005/0148342 A1 * | 7/2005 | Sylvain ....................... 455/456.3 |
| 2006/0126565 A1 * | 6/2006 | Shaheen ........................ 370/331 |
| 2006/0187858 A1 * | 8/2006 | Kenichi et al. ................ 370/254 |
| 2006/0245406 A1 * | 11/2006 | Shim ............................. 370/338 |
| 2006/0258356 A1 * | 11/2006 | Maxwell et al. .............. 455/436 |
| 2007/0184819 A1 * | 8/2007 | Barriga-Caceres et al. .. 455/411 |
| 2008/0146255 A1 * | 6/2008 | Gopalakrishnan et al. ... 455/466 |
| 2009/0043902 A1 * | 2/2009 | Faccin .......................... 370/229 |
| 2009/0149157 A9 * | 6/2009 | Gallagher et al. ......... 455/414.1 |
| 2010/0100951 A1 * | 4/2010 | Kutt et al. .......................... 726/9 |
| 2010/0211628 A1 * | 8/2010 | Shah ............................. 709/203 |
| 2010/0272057 A1 * | 10/2010 | Chen ............................. 370/329 |
| 2010/0290337 A1 * | 11/2010 | Suvi et al. ..................... 370/217 |
| 2010/0296453 A1 * | 11/2010 | Grahn et al. .................. 370/328 |
| 2011/0051658 A1 * | 3/2011 | Jin et al. ........................ 370/328 |
| 2011/0143756 A1 * | 6/2011 | Gallagher et al. ......... 455/435.1 |
| 2011/0149797 A1 * | 6/2011 | Taaghol et al. ............... 370/254 |
| 2011/0199963 A1 * | 8/2011 | Shaw ............................. 370/328 |
| 2012/0033679 A1 * | 2/2012 | Horn ............................. 370/401 |
| 2012/0047275 A1 * | 2/2012 | Yang et al. .................... 709/228 |

* cited by examiner

*Primary Examiner* — Abdullah Riyami  
(74) *Attorney, Agent, or Firm* — Jefferson IP Law, LLP

(57) ABSTRACT

An apparatus and method for determining validity of a Wireless Fidelity (WiFi) connection in a wireless apparatus is provided. In the method, a query is performed on a specific Domain Name Server (DNS) via a connected Access Point (AP). When a response to the query on the specific DNS is received, a connection to a specific node is attempted via the connected AP. When the connection to the specific node is successful, a valid WiFi connection is determined. The WiFi connection is maintained. Therefore, a WiFi apparatus is allowed to connect to only a valid AP, so that convenience is provided to a user and the WiFi apparatus is prevented from wasting power.

18 Claims, 3 Drawing Sheets

APPARATUS AND METHOD FOR DETERMINING VALIDITY OF WIFI CONNECTION IN WIRELESS COMMUNICATION SYSTEM

PRIORITY

This application claims the benefit under 35 U.S.C. §119 (a) of a Korean patent application filed in the Korean Intellectual Property Office on Sep. 7, 2010 and assigned Serial No. 10-2010-0087297, the entire disclosure of which is hereby incorporated by reference.

BACKGROUND OF THE INVENTION

1. Field of the Invention:

The present invention relates to a wireless communication system. More particularly, the present invention relates to an apparatus and a method for determining validity of a Wireless Fidelity (WiFi) connection in an apparatus that uses WiFi.

2. Description of the Related Art:

A WiFi apparatus needs to connect to an Access Point (AP) in order to use a WiFi network (for example, a wireless Local Area Network (LAN)).

In the case where the WiFi apparatus is connected to an AP, since the WiFi apparatus cannot determine whether a connection to the Internet is valid, the WiFi apparatus continues to maintain a connection even when the connection is not a valid connection.

When the connection is an invalid connection, the WiFi apparatus cannot communicate with an external network and so cannot use the Internet. The invalid connection is described in the following.

First, an invalid connection may occur when a WiFi apparatus cannot determine a valid Internet Protocol (IP) address.

In the case where a Dynamic Host Configuration Protocol (DHCP) is problematic or the WiFi apparatus is connected to a false AP, the WiFi apparatus may determine an invalid IP address such as 169.254.x.x. In this case, the WiFi apparatus cannot perform WiFi communication due to this invalid IP address.

In addition, a case may occur in which an AP itself may not be connected to the Internet or cannot transmit/receive a packet to/from the Internet. That is, a case may occur in which an AP itself cannot actually transmit/receive a packet to/from the Internet even when the WiFi apparatus determines a valid IP address. In this case, the WiFi apparatus cannot use the Internet or can use only an intranet.

As described above, in the case where the WiFi apparatus is connected to an invalid AP, the WiFi apparatus is not able to automatically perform an AP search or establish a connection even if a valid AP exists on an AP list of the WiFi apparatus.

In addition, the WiFi apparatus consumes more power when connected to an AP and operating in a power save mode as compared to when it is in a deep sleep state. Accordingly, accessing a false AP causes a waste of power.

Therefore, a need exists for an apparatus and method for determining a WiFi connection in a wireless communication system.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for determining a Wireless Fidelity (WiFi) connection in a wireless communication system.

Another aspect of the present invention is to provide an apparatus and a method for providing convenience to a user by connecting to only a valid Access Point (AP).

Still another aspect of the present invention is to provide an apparatus and a method for preventing a WiFi apparatus from wasting power by connecting to only a valid AP.

In accordance with an aspect of the present invention, a method for determining validity of a WiFi connection in a wireless communication system is provided. The method includes performing a query on a specific Domain Name Server (DNS) via a connected AP, when receiving a response to the query to the specific DNS, trying a connection to a specific node via the connected AP, when the connection to the specific node is successful, determining that a WiFi connection is valid, and maintaining the WiFi connection.

In accordance with another aspect of the present invention, an apparatus for determining validity of a WiFi connection in a wireless communication system is provided. The apparatus includes a controller for performing a query on a specific DNS via a connected AP, when receiving a response to the query to the specific DNS, for trying a connection to a specific node via the connected AP, when the connection to the specific node is successful, for determining that a WiFi connection is valid, and for maintaining the WiFi connection, a display unit for displaying information output by the controller, an input unit for providing a user's input to the controller, and a WiFi modem for transmitting information output for transmission by the controller, for providing received information to the controller, and for communicating via the AP.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for determining a Wireless Fidelity (WiFi) connection in a wireless communication system.

Figure 1:
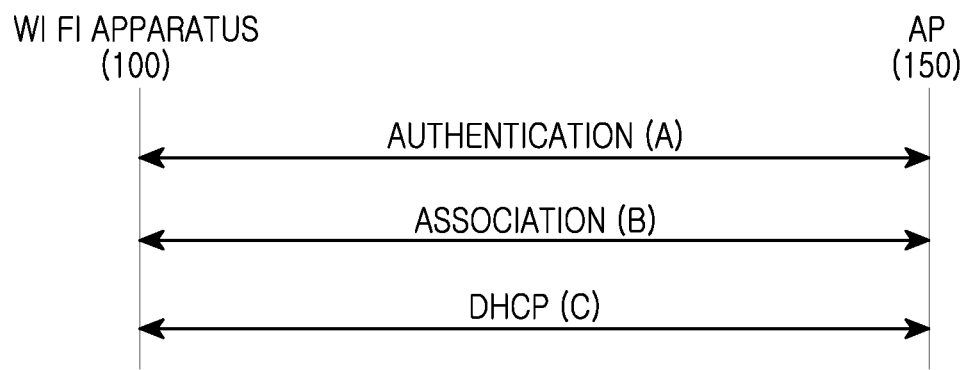
FIG. 1 is a view illustrating a Wireless Fidelity (WiFi) connection process according to an exemplary embodiment of the present invention.

FIG. 1 is a view illustrating a WiFi connection process according to an exemplary embodiment of the present invention.

Referring to FIG. 1, a WiFi apparatus 100 performs an authentication process (step A), an association process (step B), and a Dynamic Host Configuration Protocol (DHCP) process (step C) with an Access Point (AP) 150, and connects to a network to operate.

After succeeding in the authentication and connection to the AP 150, the WiFi apparatus 100 determines a dynamic Internet Protocol (IP) address through a DHCP in case of not using a static IP address.

When the connection with the AP 150 is released, the WiFi apparatus 100 may search for a neighbor AP automatically and periodically to attempt a connection.

According to an exemplary embodiment of the present invention, a WiFi connection validity check option may be added to a WiFi menu so that only a user who desires to operate a WiFi connection validity check function may use the function. Accordingly, the WiFi connection validity check function may be operated only when the option is set.

To determine the validity of a WiFi connection, exemplary embodiments of the present invention use a Domain Name Server (DNS) query and a Transmission Control Protocol (TCP) connection function. In the related art, connectivity with a relevant IP communication apparatus may be determined using a ping command. However, a relevant IP communication apparatus may be set not to respond to a ping, or a firewall may be installed in a network of a connected AP, so that a ping may not be used. Accordingly, exemplary embodiments of the present invention use a TCP connection with priority.

Figure 2:
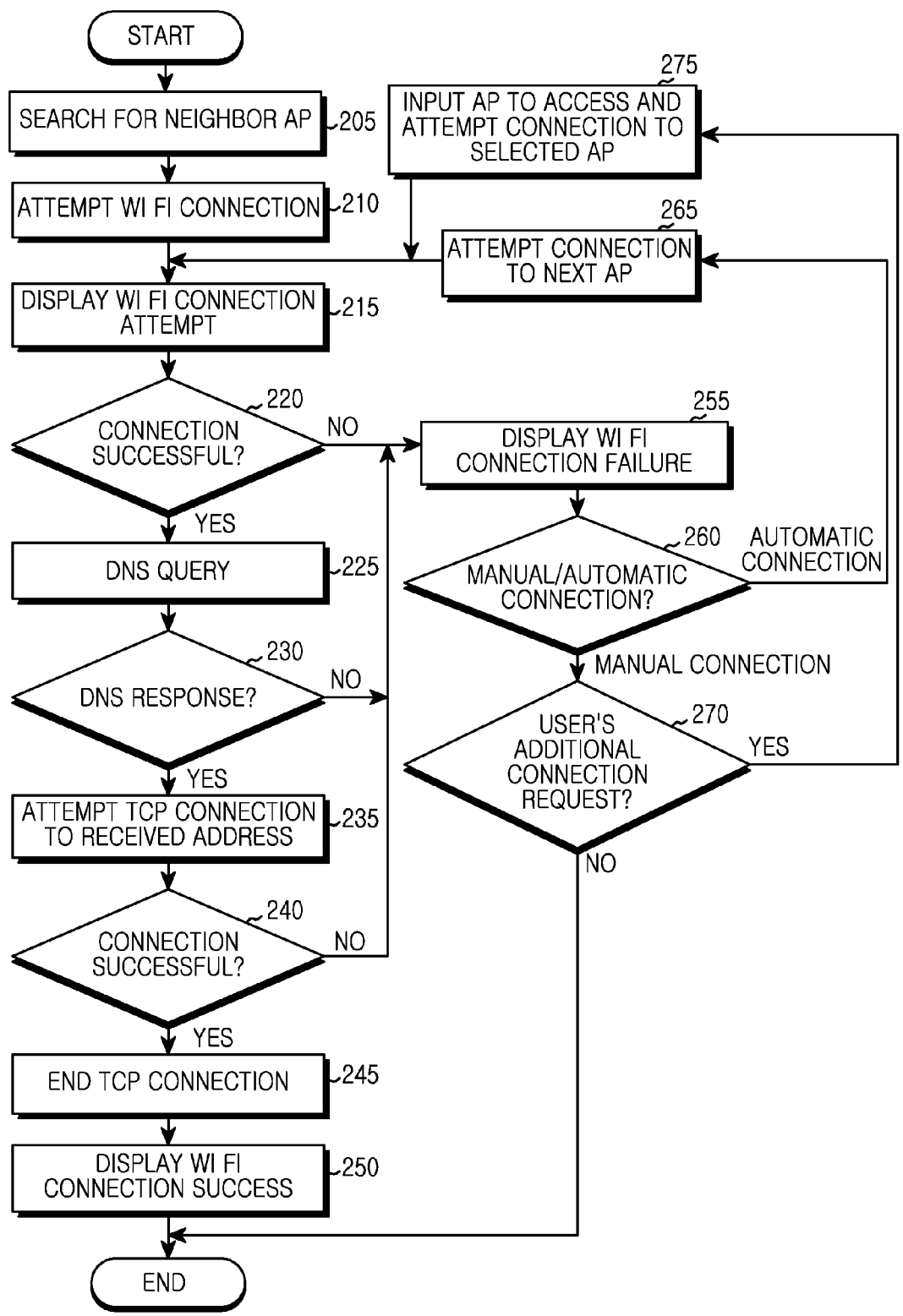
FIG. 2 is a flowchart illustrating a method for determining a valid WiFi connection in a WiFi apparatus according to an exemplary embodiment of the present invention.

FIG. 2 is a flowchart illustrating a method for determining a valid WiFi connection in a WiFi apparatus according to an exemplary embodiment of the present invention.

Referring to FIG. 2, a function described in FIG. 2 operates in the case where a WiFi connection validity check option is set in a WiFi menu of a WiFi apparatus by a user, or operates in the case where the function is set to operate automatically.

The WiFi apparatus searches for neighboring APs in step 205. Upon detection of neighboring APs, the WiFi apparatus attempts a connection to an AP having the highest signal strength or having a predetermined Service Set IDentifier (SSID) in step 210.

The WiFi apparatus may display that it is currently attempting a WiFi connection on a display unit in step 215.

In step 220, the WiFi apparatus determines if the WiFi connection is successful. When it is determined in step 220 that the WiFi connection is successful, the WiFi apparatus performs a DNS query in step 225. The DNS query step denotes a process for determining an IP address of a predetermined specific server. For example, the DNS query step denotes a process for determining an IP address of www.samsung.com.

In step 230, the WiFi apparatus determines if a DNS response is received. When it is determined in step 230 that a DNS response is received, that is, in case of determining an IP address of the specific server, the WiFi apparatus attempts a TCP connection to the determined IP address in step 235. The TCP connection includes a TCP 3 way handshaking process.

In step 240, the WiFi apparatus determines if the TCP connection is successful. When it is determined in step 240 that the TCP connection is successful, the WiFi apparatus ends the TCP connection in step 245, and displays that a WiFi connection is successful on a display unit in step 250. In this case, since the connection is a valid connection, the WiFi apparatus maintains the WiFi connection.

When it is determined that the WiFi connection fails in step 220, that the DNS response is not received in step 230, or that the TCP connection fails in step 240, the WiFi apparatus displays that the WiFi connection has failed on the display unit in step 255. Here, the case where the TCP connection has failed denotes a case where the WiFi apparatus and the DNS server are located in the same intranet and so a DNS query is possible but packet transmission/reception to/from an external network (the Internet) is impossible.

In step 260, it is determined whether an automatic or manual connection setting is possible. If it is determined in step 260 that an automatic connection setting is possible, the WiFi apparatus attempts a WiFi connection to the next AP in step 265. The next AP may be an AP, except an existing AP to which the WiFi apparatus has tried a connection, having the highest signal strength or an AP among APs having a specific SSID, except an existing AP to which the WiFi apparatus has tried a connection, having the highest signal strength. After that, the WiFi apparatus starts from the process of step 215.

If it is determined in step 260 that a manual connection setting is possible, the WiFi apparatus displays a user's additional connection request via the display unit, and determines in step 270 whether the user's additional connection request exists via an input unit. When it is determined in step 270 that the additional connection request exists, the WiFi apparatus receives an AP to access from the user, and attempts a connection to the selected AP in step 275. After that, the WiFi apparatus starts from the process of step 215.

When it is determined in step 270 that the user's additional connection request does not exist, the WiFi apparatus ends the present algorithm.

Figure 3:
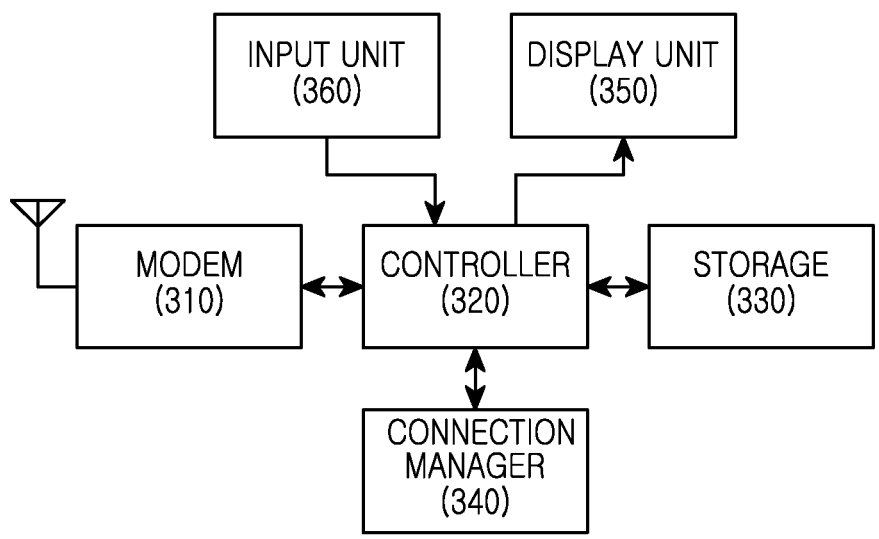
FIG. 3 is a block diagram illustrating a WiFi apparatus according to an exemplary embodiment of the present invention.

FIG. 3 is a block diagram illustrating a WiFi apparatus according to an exemplary embodiment of the present invention.

Referring to FIG. 3, the WiFi apparatus includes a modem 310, a controller 320, a storage 330, a connection manager 340, a display unit 350, and an input unit 360.

The modem 310 is a module for communicating with a different apparatus and includes a Radio Frequency (RF)

processor and a baseband processor. The RF processor changes a signal received via an antenna into a baseband signal and provides the same to the baseband processor, and changes a baseband signal from the baseband processor into an RF signal so that the signal may be actually transmitted on an RF path, and transmits the same via the antenna. In an exemplary embodiment of the present invention, the modem 310 denotes a WiFi modem.

The controller 320 controls an overall operation of the WiFi apparatus. For example, the controller 320 performs processes and controls for voice communication (e.g., Voice Over IP (VoIP)) and packet communication, and more particularly, controls the connection manager 340 to determine validity of a WiFi connection.

The storage 330 stores a program for controlling an overall operation of the WiFi apparatus, and temporary data occurring during execution of programs.

The display unit 350 displays information output by the controller 320 or the connection manager 340. The display unit 350 may be a Liquid Crystal Display (LCD).

The connection manager 340 searches for a neighbor AP, and attempts to access an AP having the highest signal strength or an AP having a predetermined SSID. In this step, the connection manager 340 may display that a WiFi connection is currently tried on the display unit 350.

When the WiFi connection is successful, the connection manager 340 performs a DNS query. The DNS query step denotes a process for determining an IP address of a predetermined specific server. For example, the DNS query step denotes a process for determining an IP address of www.samsung.com.

In the case where the connection manager 340 receives a DNS response, that is, in the case where the connection manager 340 determines an IP address of the specific server, the connection manager 340 attempts a TCP connection to the determined IP address. The TCP connection includes a TCP 3-way handshaking process.

When the TCP connection is successful, the connection manager 340 ends the TCP connection, and displays that a WiFi connection is successful on the display unit 350. In this case, since the connection is a valid connection, the connection manager 340 maintains the WiFi connection.

When the WiFi connection fails, the DNS response is not received, or the TCP connection fails, the connection manager 340 displays that the WiFi connection has failed on the display unit 350.

Here, the case where the TCP connection has failed denotes a case where the WiFi apparatus and the DNS server are located in the same intranet and so a DNS query is possible but packet transmission/reception to/from an external network (the Internet) is impossible.

In a state of automatic connection setting, the connection manager 340 attempts a WiFi connection to the next AP. The next AP may be an AP having the highest signal strength except an existing AP to which the connection manager has tried a connection, or an AP having the highest signal strength except an existing AP to which the connection manager has tried a connection among APs having a specific SSID.

In a state of manual connection setting, the connection manager 340 displays a user's additional connection request via the display unit 350, and determines whether the user's additional connection request exists via the input unit 360. When the additional connection request exists, the connection manager 340 receives an AP to access from the user, and tries a connection to the selected AP.

In the above block configuration, the controller 320 may perform the function of the connection manager 340. Separate configuration and illustration of the connection manager 340 in an exemplary embodiment of the present invention is for separately describing each function. Therefore, in actual realization of a product, all or some of the functions of the connection manager 340 may be processed by the controller 320.

Exemplary embodiments of the present invention provide convenience to a user and prevent a WiFi apparatus from wasting power by allowing the WiFi apparatus to connect to only a valid AP.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a validity of an internet connection, the method comprising:
    providing a list of a plurality of Access Points (APs) on a screen of the electronic device;
    detecting a selection of an AP from the list of the plurality of APs;
    establishing a connection with the selected AP;
    transmitting, to the connected AP, a query which is designated to be sent to a Domain Name Server (DNS) to determine whether the connected AP has a valid internet connection; and
    providing a visual feedback of the validity of the internet connection based on whether there is a response from the DNS,
    wherein the response of the query from the DNS comprises at least an IP address, and
    wherein the query comprises a predetermined domain name which is stored in the electronic device.

2. The method of claim 1, wherein the providing of the visual feedback of the validity of the internet connection based on whether there is the response from the DNS further comprises:
    displaying that the connected AP has the valid internet connection if the response is not received.

3. The method of claim 1, further comprising:
    removing the connected AP from the AP list if the response is not received.

4. The method of claim 1, wherein the transmitting of the query comprises transmitting the query without using a web browser in order to check whether the connected AP has the valid internet connection.

5. The method of claim 1, wherein the response comprises at least one IP address of the domain name, and
    wherein the IP address of the domain name is predetermined.

6. The method of claim 1, wherein the providing of the visual feedback of the validity of the internet connection based on whether there is the response from the DNS to the transmitted query further comprising:
    displaying that the connected AP has the valid internet connection if the response is received.

7. The method of claim 1, wherein the connected AP is an AP having a highest signal strength or an AP having a predetermined Service Set Identifier (SSID).

8. An electronic device for determining a validity of an internet connection, the electronic device comprising:
    a screen configured to provide a list of a plurality of Access Points (APs) on a screen of the electronic device; and
    a controller configured to detect a selection of an AP from the list of the plurality of APs, to establish a connection with the selected AP, and to transmit, to the connected AP, a query which is designated to be sent to a Domain Name Server (DNS) to determine whether the connected AP has a valid internet connection, wherein the screen further configured to provide a visual feedback of the validity of the internet connection based on whether there is a response to the query from the DNS, wherein the response of the query from the DNS comprises at least IP address, and, wherein the query comprises a predetermined domain name which is stored in the electronic device.

9. The electronic device of claim 8, wherein the screen is configured to display that the connected AP has an invalid internet connection if the response is not received.

10. The electronic device of claim 8, wherein the controller is configured to remove the connected AP from the AP list if the response is not received.

11. The electronic device of claim 8, wherein the controller is configured to transmit the query without using a web browser in order to check whether the connected AP has the valid internet connection.

12. The electronic device of claim 8, wherein the response comprises at least one IP address of the domain name, and wherein the IP address of the domain name is predetermined.

13. The electronic device of claim 8, wherein the screen is configured to display that the connected AP has the valid internet connection if the response is received.

14. The electronic device of claim 8, wherein the connected AP is an AP having a highest signal strength or an AP having a predetermined Service Set Identifier (SSID).

15. The method of claim 2, further comprising:
establishing a connection to another AP from the list of the plurality of APs, if the response is not received.

16. The method of claim 15, wherein the another AP comprises an AP where signal strength is strongest except the connected AP to which the electronic device attempted a connection.

17. The electronic device of claim 9, wherein the controller is configured to establish a connection to another AP from the list of the plurality of APs if the response is not received.

18. The electronic device of claim 17, wherein the another AP comprises an AP where signal strength is strongest except the connected AP to which the electronic device attempted a connection.

* * * * *

UNITED STATES PATENT AND TRADEMARK OFFICE
CERTIFICATE OF CORRECTION

| | |
|---|---|
| PATENT NO. | : 8,929,349 B2 |
| APPLICATION NO. | : 13/214504 |
| DATED | : January 6, 2015 |
| INVENTOR(S) | : Youn-Ho Park |

It is certified that error appears in the above-identified patent and that said Letters Patent is hereby corrected as shown below:

In the claims,

Delete column 6, line 65, the text "Points (APs) on a screen of the electronic device; and" and insert the following:

--Points (APs) on the screen of the electronic device; and--

Signed and Sealed this
Fifth Day of May, 2015

Michelle K. Lee
*Director of the United States Patent and Trademark Office*